(12) United States Patent
Al Alam et al.

(10) Patent No.: US 8,494,744 B2
(45) Date of Patent: Jul. 23, 2013

(54) DETERMINATION OF ACCELERATION BEHAVIOUR

(75) Inventors: Assad Al Alam, Enskededalen (SE); Jon Andersson, Södertälje (SE); Per Sahlholm, Huddinge (SE)

(73) Assignee: Scania CV AB (publ) (SE)

( * ) Notice: Subject to any disclaimer, the term of this patent is extended or adjusted under 35 U.S.C. 154(b) by 168 days.

(21) Appl. No.: 13/129,836

(22) PCT Filed: Nov. 17, 2009

(86) PCT No.: PCT/SE2009/051299
§ 371 (c)(1),
(2), (4) Date: Jun. 9, 2011

(87) PCT Pub. No.: WO2010/062242
PCT Pub. Date: Jun. 3, 2010

(65) Prior Publication Data
US 2012/0130611 A1    May 24, 2012

(30) Foreign Application Priority Data
Nov. 26, 2008 (SE) ........................................ 0850099

(51) Int. Cl.
*G06F 7/70* (2006.01)
(52) U.S. Cl.
USPC .......................................................... 701/70
(58) Field of Classification Search
USPC .................................. 701/70, 79, 91, 93, 110
See application file for complete search history.

(56) References Cited

U.S. PATENT DOCUMENTS

| 5,832,400 A | * | 11/1998 | Takahashi et al. | .............. 701/53 |
| 2005/0085974 A1 | | 4/2005 | Hedman et al. | |
| 2008/0314666 A1 | * | 12/2008 | Inou et al. | .................... 180/170 |

FOREIGN PATENT DOCUMENTS

| WO | WO 03/041987 A1 | 5/2003 |
| WO | WO 2005/005191 A1 | 1/2005 |

OTHER PUBLICATIONS

International Search Report dated Jan. 20, 2010, issued in corresponding international application No. PCT/SE2009/051299.

* cited by examiner

*Primary Examiner* — Kim T Nguyen
(74) *Attorney, Agent, or Firm* — Ostrolenk Faber LLP

(57) ABSTRACT

A method and control unit determines a fuel efficient acceleration behavior of a motor vehicle for a predetermined road section. The determination of the acceleration behavior is based on a determined initial speed of the motor vehicle in a first position in the road section, and a determined target speed of the motor vehicle in a determined second position in the road section, the second position being separated from the first position by an acceleration distance. The first position is determined such that the acceleration distance is less than or equal to a maximal acceleration distance $S_{acc}$, the maximal acceleration distance $S_{acc}$ being dynamically determined based on at least one first road condition for the road section and on at least one characteristic of the motor vehicle.

21 Claims, 3 Drawing Sheets

DETERMINATION OF ACCELERATION BEHAVIOUR

CROSS-REFERENCE TO RELATED APPLICATIONS

The present application is a 35 U.S.C. §§371 national phase conversion of PCT/SE2009/051299, filed Nov. 17, 2009, which claims priority of Swedish Application No. 0850099-3, filed Nov. 26, 2008, the contents of which are incorporated by reference herein. The PCT International Application was published in the English language.

FIELD OF THE INVENTION

The present invention relates to a method for determining a fuel efficient acceleration behaviour for a motor vehicle.

The present invention also relates to a method for an automated speed control for a motor vehicle.

The present invention also relates to a computer program and a computer program product programmed for implementing the methods of the invention.

The present invention also relates to a control unit arranged for determining a fuel efficient acceleration behaviour of a motor vehicle.

The present invention also relates to a system for an automated speed control of a motor vehicle.

BACKGROUND OF THE INVENTION

To accurately control the speed of a motor vehicle, such as a car, a truck, a bus, a tractor or the like, suitable accelerations and decelerations have to be determined and applied. For environmental and cost reasons, these accelerations and decelerations should be performed in a fuel efficient manner.

A suitable speed of the motor vehicle in a certain situation or position can depend on a number of parameters, such as specific traffic situations or road conditions. Such road conditions include among other parameters a desired speed for a part of the road where the vehicle is, e.g. depending on speed limits, a condition of the road surface, which, as is well known, can get slippery due to rain or ice, or an uphill or downhill slope being present.

Today, there are many electronic aids available for determining such parameters being used for determining the suitable speed of the motor vehicle. Such electronic aids now being publicly available include electronic positioning systems, such as the Global Positioning System (GPS) and other corresponding positioning systems and electronic maps. Such positioning systems can provide three dimensional positioning information, i.e. information relating to latitude, longitude and altitude. Also, the electronic maps can include speed limits being set for different sections of the road as well as topology information. Also, weather conditions, such as temperature, rain and/or snowfall are provided to the vehicle by sensors on the vehicle itself or by information being transmitted to the vehicle from one or more outer sources.

The prior art system shown in patent application US2005/0085974 uses such electronic aids to some extent in order to minimize fuel consumption. In this prior art system, GPS information is used for determining instantaneous information, of that moment and electronic map information is used for determining future positions. Further, a road incline in a specific position is determined by the use of electronic sensors on the vehicle, and by extrapolations from such road incline determinations and a topology surrounding the vehicle can be estimated. These parameters are then used for determining a throttle opening such that, for example, gravity is taken into account when adjusting the throttle opening.

However, control of the amount of fuel being injected in an engine or adjustment of the throttle opening (i.e. performing adjustment of the speed of the vehicle) by only taking into account such parameters that minimize the fuel consumption, as in the prior art, may lead to a driving behavior that is irritating to other road users. Thus, drivers of vehicles following such a motor vehicle might find that the driving behaviour of the motor vehicle is annoying, since it does not follow well established driving norms.

Further, a speed control system not following such well established driving norms might also be perceived as non-intuitive and unacceptable by the driver of the motor vehicle itself, which might cause him to disconnect or override the speed control system. Such disconnection or overriding of the speed control system would jeopardize fuel efficiency, since the driver then disobeys the suggestions of the speed control system, which would lead to a higher fuel consumption.

Thus, there is a need in the prior art for a solution which offers a fuel efficient acceleration behaviour for a motor vehicle and at the same time is regarded by the driver of the motor vehicle himself as well as the drivers of surrounding vehicles as having an understandable and acceptable driving behaviour.

SUMMARY OF THE INVENTION

It is an object of the present invention to provide a fuel efficient acceleration behaviour determination that solves the above stated problem.

The present invention aims to provide a controlled acceleration behaviour being perceived as intuitive for the driver of the motor vehicle.

The object is achieved by a method for determining a fuel efficient acceleration according to the invention.

The object is also achieved by a method for automated speed control of a motor vehicle according to the invention.

The object is also achieved by a computer program and a computer program product including a computer readable medium implementing the methods of the invention.

The object is also achieved by a control unit arranged for determining a fuel efficient acceleration behavior according to the invention.

The object is also achieved by a system for an automated speed control of a motor vehicle according to the invention.

The fuel efficient acceleration behaviour determination methods and control units according to the present invention are characterized in that the distance during which the acceleration is performed, i.e. the acceleration distance, is limited to a certain length, i.e. the maximal acceleration distance $S_{acc}$. This maximal acceleration distance $S_{acc}$ is dynamically determined based on at least one road condition and on at least one motor vehicle characteristic.

By limiting the acceleration distance in accordance with the present invention, an acceleration behaviour is achieved, which feels like an acceleration the driver of the motor vehicle is used to from acceleration on level roads. Thus, when determining the maximal acceleration distance $S_{acc}$ based on at least one road condition and on at least one motor vehicle characteristic, an acceleration is achieved, which is perceived as intuitive and normal by the driver of the motor vehicle.

The present invention makes use of a general acceptance being present for heavy vehicles in different situations for lowering the fuel consumption. For example, the maximal acceleration distance $S_{acc}$ can according to the invention be accepted to be longer on an uphill slope or for a part of the road section having a number of sharp curves, since this would generally be accepted by surrounding vehicle drivers. On the other hand, the maximal acceleration distance $S_{acc}$ is according to the present invention made shorter for a downhill slope, since there is less acceptance by the other road users for a long acceleration distance in such a situation.

Thus, the acceleration behaviour will be accepted by both the driver himself and by the surrounding vehicles. Therefore, the overall fuel consumption is reduced, since the automated acceleration control will be activated during a higher percentage of the time the motor vehicle is on the road than if the acceleration would have been non-intuitive for the driver and surrounding vehicles.

Also, the acceleration behaviour is dynamically adjusted in accordance with changes in the at least one road condition and/or motor characteristic, respectively, which results in a very efficient fuel consumption reduction.

According to an embodiment of the present invention, characteristics for the motor vehicle, such as rpm and momentum of the engine are taken into account when determining the maximal acceleration distance $S_{acc}$. By taking these characteristics into account, the motor vehicle is by the driver perceived as responding, when performing the acceleration, in accordance with what the driver is used to from driving such motor vehicles.

According to an embodiment of the present invention, also at least one input from a driver of the motor vehicle is taken into account when determining the maximal acceleration distance $S_{acc}$. This has the physiological advantage that the driver has the feeling that he controls the vehicle and is in charge of the acceleration behaviour at the same time as the acceleration behaviour is controlled by the system such that fuel efficiency is still achieved.

Detailed exemplary embodiments and advantages of the acceleration behaviour determined in accordance with the invention will now be described with reference to the appended drawings illustrating some preferred embodiments.

DETAILED DESCRIPTION OF PREFERRED EMBODIMENTS OF THE INVENTION

Generally, acceleration of a motor vehicle starts in a first position, in which the vehicle has an initial speed, and continues until the vehicle has reached a target speed. The target speed is reached in a second position, which is separated from the first position by a length corresponding to an acceleration distance. According to the present invention, a suitable acceleration behaviour is determined for a predetermined section of a road, in which the first and second positions are located.

When determining a suitable acceleration behaviour, there are a lot of parameters which could be taken into account in order to achieve an acceleration behaviour that is as efficient as possible in respect of fuel consumption. In particular, road conditions for the section of the road can be used for this purpose.

For example, one such road condition is topology of at least one part of the road section. If after a level part of the road section there is an upcoming downhill slope present in a part of the road section, during which an acceleration is wanted, it can be fuel efficient to not accelerate during the level part and utilise the gravity force in the downhill slope when performing the acceleration. Thus, by taking the topology in a predetermined section of the road into consideration when determining the acceleration behaviour, the fuel efficiency can be increased. Corresponding considerations can be made also for other road conditions.

However, the conditions for this purpose have to be used wisely. Generally, a driver of a vehicle has a well-founded opinion of what he considers to be an acceptable driving behaviour and what is not. Also, the driver gets feedback on his driving behaviour from other road users, e.g. in form of light flashes and the like. Therefore, it is important to achieve a driver acceptable acceleration behaviour.

Figure 1:
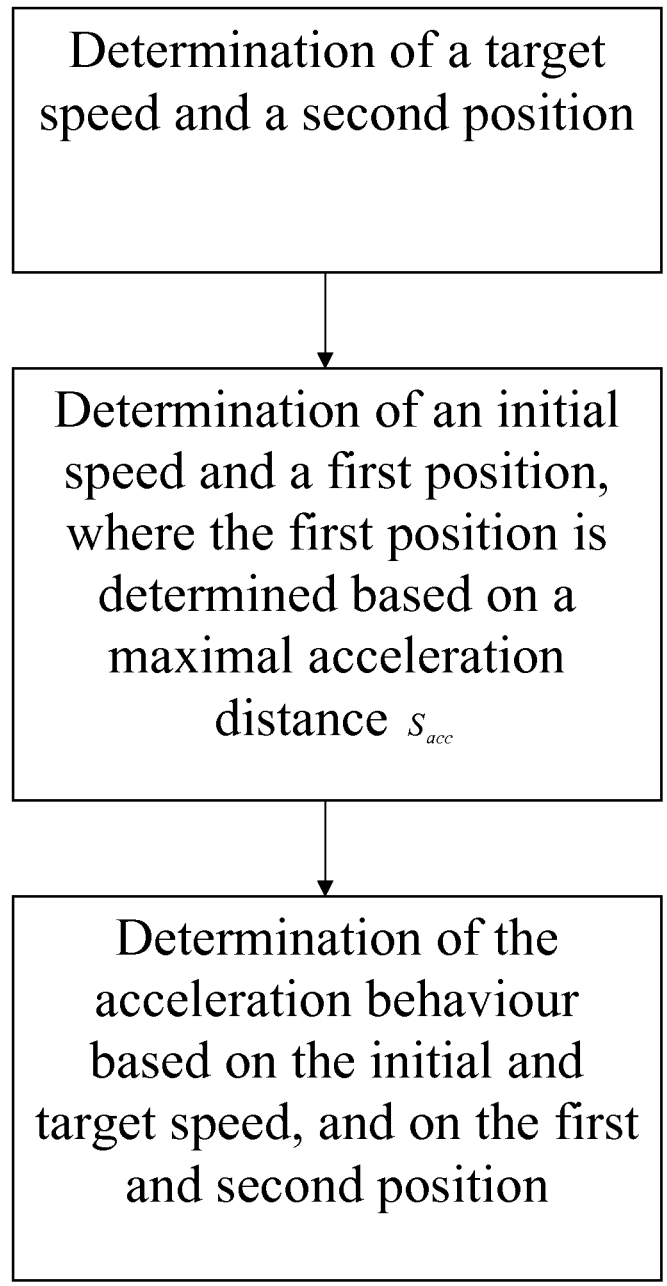
FIG. 1 shows a flow chart illustrating the method of the invention.

FIG. 1 illustrates the method of the present invention. In a first step of the method according to the present invention, a second position and a target speed are determined. The second position is the location within the predetermined section of the road, in which the target speed should have been reached at the latest. The second position and the target speed are according to an embodiment of the present invention determined based on GPS positioning in combination with information provided by digital map information. The digital map information includes essentially exact locations for speed limitations, information related to curves of the road, and the like. According to another embodiment of the invention, the target speed and the second position can also be determined dependent on a certain speed which a driver wishes to have reached in a certain location.

In a second step of the method, a first position in the road section and an initial speed are determined, where the initial speed is the speed the motor vehicle will have in the first position. The first position is, according to the invention, determined based on a maximal acceleration distance $S_{acc}$, where the maximal acceleration distance $S_{acc}$ is determined dynamically based on one or more road conditions of the road section and on one or more characteristics of the motor vehicle. Thus, the maximal acceleration distance $S_{acc}$ changes over time as the road conditions and/or motor vehicle characteristics change. The initial speed, which the vehicle should have in the first position, can, according to an embodiment of the invention be determined in a number of ways, similar to the determination of the second position, e.g. based on GPS positioning, information related to topology, curves, speed limitations and the like. The initial speed may also be determined based on an actual speed of the vehicle in a certain position, wherein the actual speed is measured by e.g. a speed indicator on the vehicle itself. This is especially advantageous if the determined first position is close to or coincides with the certain position in which the vehicle is located.

In a third step of the method according to the present invention, the acceleration behaviour to be used by the motor vehicle for the road section is determined. According to the present invention, the acceleration behaviour is determined based on the first position and the initial speed to start from in the first position, on the second position and the target speed to have been reached at latest at the second position, where the distance between the first and the second position, i.e. the acceleration distance, is limited to be shorter than or equal to the maximal acceleration distance being determined in the second step of the method, and on at least one road condition for the road section.

Thus, according to the method of the invention, the distance during which the acceleration is performed, i.e. acceleration distance, is limited to a certain length, i.e. the maximal acceleration distance $S_{acc}$, which is dynamically determined based at least one road condition and on at least one motor vehicle characteristic. By this, the maximal acceleration distance $S_{acc}$ can be appropriately chosen such that the acceleration behavior is perceived by a driver as being intuitively acceptable and resembles acceleration on a level road.

By limiting the acceleration distance to a suitable maximal acceleration distance $S_{acc}$, an acceleration behaviour is achieved, which for the driver of the motor vehicle feels like an acceleration he would have performed himself if no automated acceleration control would have been present. Thus, when the maximal acceleration distance $S_{acc}$ is chosen wisely, the acceleration resulting from the method of the invention is experienced as normal driving behaviour, both by the driver of the motor vehicle and by the other road users, and there is therefore a very low risk that the driver of the vehicle would disconnect or override the automated speed control system.

According to the present invention, the property of the acceleration to be performed within the acceleration distance, i.e. between the first and second positions, is based on at least one road condition. Thus, one or more road condition for the road section is taken into account when determining the attributes of this acceleration, e.g. how aggressive the acceleration should be throughout the acceleration distance. Thus, in some parts of the acceleration distance, more fuel can be decided to be injected into the engine than for other parts of the acceleration distance. By taking the road conditions, such as topology, into account when determining the property of the acceleration within the acceleration distance, a fuel efficient overall acceleration is achieved. The property of the acceleration may be determined to be different in different parts of the acceleration distance in order to achieve this fuel efficiency.

Thus, one or more road conditions for the road section is taken into account when determining the acceleration behaviour, both for determining the maximal acceleration distance $S_{acc}$ and for determining the attribute/property of the acceleration to actually be performed within the acceleration distance. Information related to such road conditions can be provided by e.g. a GPS, an electronic map, and/or sensors on the motor vehicle. According to an embodiment of the present invention, as was described above, such a road condition includes information based on a topology for at least one part of the road section. This makes it possible to utilise the gravity force in downhill slopes when performing the acceleration in order to increase the fuel efficiency when the topology in a predetermined section of the road is taken into consideration when determining the acceleration behaviour.

According to an embodiment of the invention, such a road condition can also include at least one desired speed for at least one part of the road section. By information from e.g. a GPS, a camera system, a traffic sign recognition system, or speed signs in combination with an electronic map, very exact information relating to locations for and distances between speed limit signs is provided. When analyzing the predetermined road section ahead of the motor vehicle, a number of such different speed limits may be taken into account when choosing an overall acceleration behaviour for the motor vehicle. By this an overall fuel efficiency can be improved.

Also, according to an embodiment of the invention, a straightness of at least one part of said road section can be taken into account when determining the acceleration behaviour. For example, as is well known, it may, for safety reasons, be advantageous to delay an acceleration until sharp curves have been passed by the vehicle. Information relating to straightness of the road section may be provided by e.g. electronic maps, sensors on the vehicle and the like.

Further road conditions that may be taken into account when determining the acceleration behaviour, according to embodiments of the invention, are traffic situations for at least one part of the road section, and a number of other vehicles present on at least one part of the road section. Information related to these road conditions can be provided by a radar system being able to detect target information, such as cars or other vehicles, immediately and further ahead of the vehicle, and ahead to the left and right of the vehicle. Also, information related to the road conditions can be provided by a camera system utilising object identification methods, or information provided by Radio Data System Traffic Message Channel (RDS-TMC).

As was stated above, in connection with the second step of the method of the invention described in FIG. 1, the maximal acceleration distance $S_{acc}$ is determined based on at least one road condition for the road section and on at least one characteristic of the motor vehicle. The at least one road condition can be one or more in the group of road conditions described above as being used for determining the acceleration behaviour. Thus, according to different embodiments of the present invention, at least one condition in the group of road conditions, including information related to a topology for at least one part of the road section, at least one desired speed for at least one part of the road section, straightness of at least one part of the road section, traffic situations for at least one part of the road section, and a number of other vehicles present on at least one part of the road section, is used when determining the maximal acceleration distance $S_{acc}$. This at least one road condition can be the same as the at least one road condition used when determining the property of the acceleration to be performed within the acceleration distance, but it can also be a different road condition. Thus, both the maximal acceleration distance $S_{acc}$ and the property of the acceleration are determined based on at least one road condition being selected from the same group of road conditions, and the selected one or more road conditions can be either the same or different ones.

As stated above, the maximal acceleration distance $S_{acc}$ is, according to the present invention, also determined based on at least one characteristic of the motor vehicle. According to an embodiment of the invention, the motor vehicle characteristic includes information related to parameters of the running engine. These parameters are either or both of revolutions per minute (rpm) and momentum of an engine of the motor vehicle. Thus, the actual working state of the engine of the motor vehicle is taken into account when determining the maximal acceleration distance.

To base the maximal acceleration distance $S_{acc}$ on both road conditions, such as topology, desired speed, straightness, traffic situations, and a number of other vehicles present, as well as on the motor characteristics, such as rpm and momentum of the engine, results in a driving behaviour being well accepted by other road users and the driver himself. For example, other road users are generally willing to accept and understand that a big and heavy motor vehicle does need a longer acceleration distance in e.g. an uphill slope or that the big and heavy motor vehicle does not accelerate very fast if there are a lot of curves in a particular road section. The present invention takes advantage of such acceptance and understanding and then dynamically extends the maximal acceleration distance $S_{acc}$ such that it is set to a relatively longer distance.

On the other hand, if there e.g. is a downhill slope or a straight part of the road, the other road users would not tolerate a very long acceleration distance. Thus, for e.g. a downhill slope and/or a straight part of the road, the maximal acceleration distance $S_{acc}$ is preferably set to a relatively shorter distance.

Also, since the rpm and the momentum of the engine are taken into account when determining the maximal acceleration distance $S_{acc}$, the motor vehicle can be made to respond, when performing the acceleration, in accordance with what the driver is used to from driving such motor vehicles.

According to an embodiment of the present invention, the at least one motor characteristic include one or more parameters being specific for the motor vehicle. These parameters are weight of the vehicle; engine characteristics, such as if the engine is a diesel or petrol engine; air resistance for the motor vehicle; transmission used by the motor engine, where different transmissions have different characteristics; brake system used in the motor vehicle; roll resistance for the vehicle; total gear ratio for the motor vehicle; inertial forces acting on the motor vehicle; and various friction forces having an impact on the motor vehicle.

Figure 2:
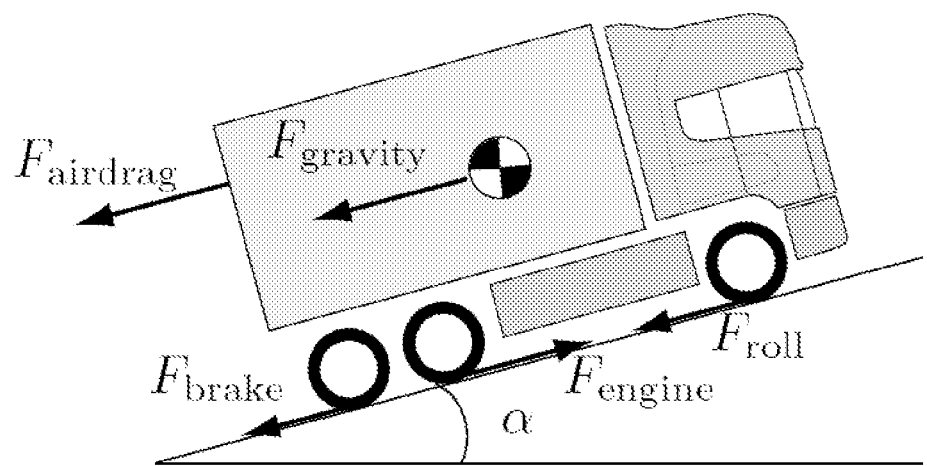
FIG. 2 illustrates forces having an impact on the vehicle.

More in detail, according to an embodiment of the present invention, and illustrated in FIG. 2, the maximal acceleration distance is determined while keeping the engine running in a state of optimal efficiency $\eta_{max}(G,\delta)$, i.e. in a state in which the engine is maximally efficient. This state of optimal efficiency $\eta_{max}(G,\delta)$ is determined in an electronic control unit, and is based on a minimal fuel consumption $\delta$ and a correctly chosen gear G, where the fuel consumption depends on the particular engine in the motor vehicle and on parameters of the running engine, i.e. on the used rpm and the momentum of the engine, and the gear G chosen depends on the rpm.

For the engine running in the state of optimal efficiency $\eta_{max}(G,\delta)$, the following equations describe the forces on the motor vehicle in a general situation illustrated in FIG. 2:

$$m_t\dot{v}(t) = F_{engine}(\eta_{max}) - F_{brake} - F_{airdrag}(v) - F_{roll}(\alpha) - f_{gravity}(\alpha) = \quad \text{(Eq. 1)}$$

$$\frac{i_t i_f \eta_t \eta_f}{r_w} M_{eng}(\eta_{max}) - F_{brake} -$$

$$\frac{1}{2} c_w \rho_a A_a v^2 - c_r mg\cos(\alpha) - mg\sin(\alpha) = F_{sum},$$

where $$F_{engine}(\eta_{max}) = \frac{i_t i_f \eta_t \eta_f}{r_w} M_{eng}(\eta_{max})$$

is the net engine force, which is dependent on the gear ratios $i_t$, $i_f$ the efficiencies $\eta_t$, $\eta_f$ the wheel radius $r_w$, and the engine torque measurement $M_{eng}(\eta_{max})$, $F_{brake}$ is the force caused by the braking system, $$F_{airdrag}(v) = \frac{1}{2} c_w \rho_a A_a v^2$$

is the force caused by the air resistance of the motor vehicle, which is dependent on the vehicle speed v, the constant air drag coefficient $c_w$, the vehicle frontal area $A_a$, and the air density $\rho_a$, $F_{roll}(\alpha) = c_r mg \cos(\alpha)$ is the force caused by the rolling resistance $c_r$ due to the motor vehicle mass m, where $\alpha$ is the incline of the road, $F_{gravity}(\alpha) = mg \sin(\alpha)$ is the force of gravity, where $\alpha$ is the incline of the road, $m_t$ is a total dynamic vehicle mass, where $$m_t = \frac{J_w}{r_w^2} + m + \frac{i_t^2 i_f^2 \eta_t \eta_f J_e}{r_w^2}$$

and $J_w$ and $J_e$ represent an inertia of the engine and the wheels respectively, and v is the speed of the motor vehicle.

If the chain rule is applied on equation 1, the following equation is derived:

$$\dot{v}(t) = \quad \text{(eq. 2)}$$

$$\frac{F_{sum}}{m_t} = \frac{dv}{ds}\frac{ds}{dt} = \frac{dv}{ds}v \Rightarrow \dot{v}(s) = \frac{F_{sum}(s)}{vm_t} \Rightarrow v(s) = \int \frac{F_{sum}(s)}{vm_t} ds,$$

where the speed is expressed with respect to distance (and not in respect of time). Therefore, if we further integrate equation 2, we will arrive with an expression for an acceleration distance, which defines a fuel efficient acceleration behaviour, taking into account road characteristics (topology in form of the incline $\alpha$) and motor vehicle characteristics. Thus, the maximal acceleration distance $S_{acc}$ can, according to an embodiment of the present invention, be determined by:

$$s_{acc} = \int_{v_{initial}}^{v_{target}} \int \frac{F_{sum}(s)}{vm_t} ds, \quad \text{(eq. 3)}$$

Where $v_{initial}$ and $v_{target}$ are the initial and target speed, respectively, for the motor vehicle in the first and second position of the road section, respectively.

When determining the maximal acceleration distance $S_{acc}$ in accordance with equation 3, a very exact determination of the maximal acceleration distance $S_{acc}$ which results in a fuel efficient driving behaviour is achievable.

According to an embodiment of the present invention, also at least one input from a driver of the motor vehicle is taken into account when determining the maximal acceleration distance $S_{acc}$. According to an embodiment of the invention, a value corresponding to an arbitrary maximal acceleration distance $S_{acc}$ and being input by the driver is taken into account. Here, the driver can input a maximal acceleration distance $S_{acc}$ of his own choice of at least a part of the road section, which has the advantage that the driver has the feeling that he is in charge of the acceleration behaviour.

According to an embodiment a value corresponding to one adjustment coefficient k in a set of predefined adjustment coefficients can be chosen by the driver. According to this embodiment, the maximal acceleration distance, being determined in accordance with the method as described above, is considered to be a preliminary maximal acceleration distance $S_{acc_{prel}}$. The chosen predefined adjustment coefficient k is then multiplied with the preliminary maximal acceleration distance $S_{acc_{prel}}$ in order to determine the maximal acceleration distance. Thus, the maximal acceleration distance $S_{acc}$ is determined in accordance with $S_{acc} = kS_{acc_{prel}}$.

Typically, the set of adjustment coefficients k can be chosen such that it comprises values corresponding to different driving types. For instance, the set can contain three values being k=1 (corresponding to a "normal state" or "economy"), k=0.75 (corresponding to "semi-sport" or "medium"), and k=0.5 (corresponding to "sport"). To give the driver a possibility to adjust the maximal acceleration distance, by choosing one of a predefined set of adjustment coefficients k, has the advantage that the driver has a feeling of being able to control the acceleration behaviour at the same time as the influence of the driver, from a system point of view, can be controlled, since the set of adjustment coefficients k are set by the system. Thus, the driver can only adjust the acceleration behaviour within regulated limits, which guaranties that the fuel efficiency is kept at a high level.

According to an embodiment of the present invention, the driver can input a value corresponding to maximal acceleration distance $S_{acc}$, which is speed change dependent. Here, if a relatively large change in speed is to be performed, for instance when the motor vehicle enters an acceleration lane of a highway, the driver can input this to the system, which then adjusts the maximal acceleration distance $S_{acc}$ to a relatively shorter distance. On the other hand, if the change in speed is relatively small, for instance when the motor vehicle leaves a village, having a lower speed limit, and enters a country road having a slightly higher speed limit, the maximal acceleration distance $S_{acc}$ can be allowed to be relatively longer. This adjustment of the maximal acceleration distance $S_{acc}$ is advantageous, since it has been shown that other road users can tolerate that acceleration from e.g. 50 kilometers per hour to e.g. 70 kilometers per hour, when leaving a village, stretches over a relatively longer distance than acceleration from e.g. 50 kilometers per hour to e.g. 110 kilometers per hour on an acceleration lane. Also, according to an embodiment of the invention, the speed change dependent maximal acceleration distance $S_{acc}$ is determined based on the actual location of where the acceleration is to take place. Typically, GPS information and information from electronic maps can be used to determine when a shorter and a longer maximal acceleration distance $S_{acc}$ can be accepted. For instance, this information can be used to determine if the motor vehicle enters an acceleration lane of a highway or not.

For all the embodiments including that input from the driver is to be taken into account, the maximal acceleration distance $S_{acc}$ is only allowed to be adjusted within limits set by the system, such that the acceleration behaviour fulfils the requirements of traffic safety and still results in a significant increase in fuel efficiency compared to when the driver is deciding the acceleration behaviour all by himself.

According to the present invention, the suitable acceleration behaviour is determined for a predetermined road section having a certain length. According to an embodiment of the invention, this length can also be adjusted. The length can be adjusted based on performance of the system, i.e. how fuel efficient the system really is. The length can also be adjusted based on the memory and processing power being available for making the calculations and estimations in accordance with the methods of the invention.

Further, the method of the invention can be implemented by a computer program, having code means, which when run in a computer causes the computer to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Figure 3:
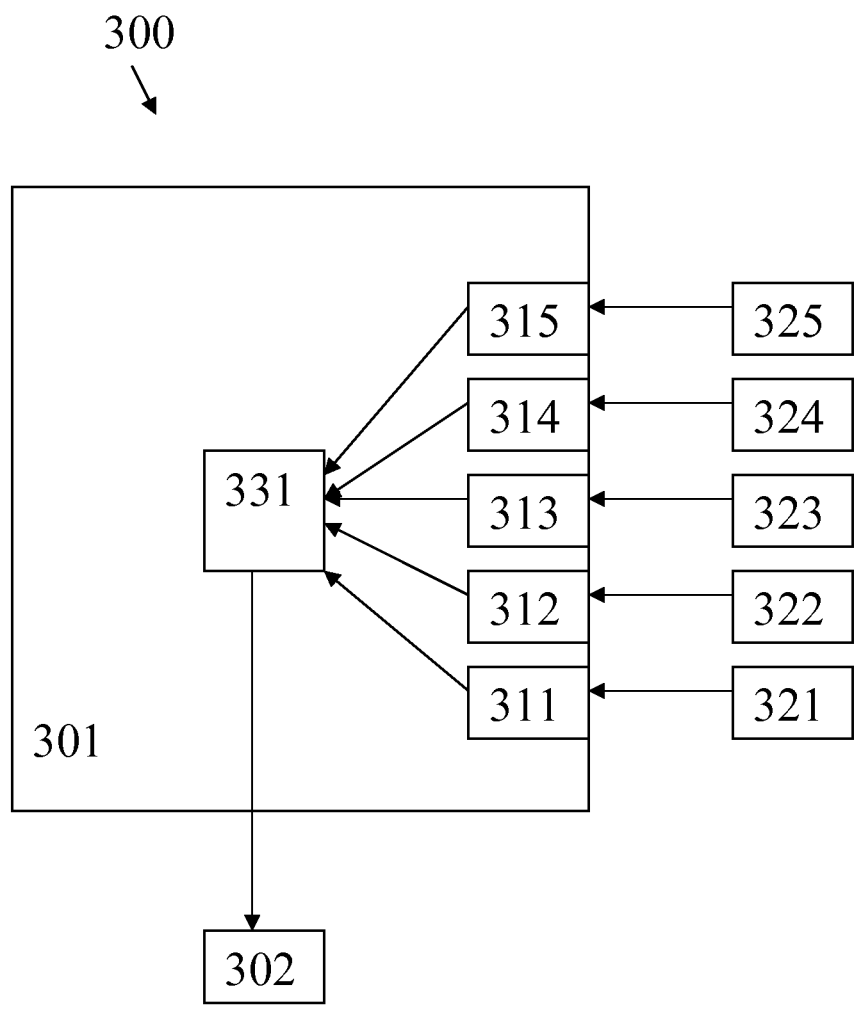
FIG. 3 shows a generalized view of the system of the invention

FIG. 3 discloses a system 300 for an automated speed control of a motor vehicle, which includes a control unit 301 being arranged for determining a fuel efficient acceleration behavior for the motor vehicle for a predetermined road section. The control unit 301 includes at least reception means 311-315, being arranged for receiving positioning information received from a positioning system unit 321, electronic map information received from a map information unit 322, information related to the at least one road condition received from a road condition unit 323, information related to the at least one characteristic of the motor vehicle received from motor vehicle characteristic unit 324, and information related to the at least one input received from an input unit 325 receiving input from the driver of the motor vehicle, respectively.

The control unit 301 further includes determination means 331, which is arranged for determining at least the first position, from which an acceleration starts, for dynamically determining the maximal acceleration distance $S_{acc}$, during which the acceleration is to be performed, based on one or more road conditions and on at least one characteristic of the motor vehicle, and for determining the property of the acceleration within the acceleration distance.

Different configurations of the system 300 are possible. For instance, in FIG. 3, the determination means 331 is depicted as one unit. However, the determination means 331 can also be constituted by at least two separate cooperating units. Also, the control unit 301 can be implemented as an electronic control unit (ECU. The units 321-325 providing information to the reception means 311-315, as well as the reception means 311-315, may be located within or adjacent to the control unit 301 or may be distributed to different locations on the motor vehicle. When one or more of these units 321-325 and reception means 311-315 are distributed in the motor vehicle, they may be connected to the control unit 301 via a Controller Area Network bus (CAN bus), or any other type of bus, or via any other kind of connection being able to provide the necessary information to the control unit 301, such as a wireless connection.

According to an embodiment of the invention, the determination means 331 also bases its decisions relating to the acceleration behaviour on input from the driver of the motor vehicle, being received by the determination means 331 from the input unit 325 via the reception means 315. The input unit 325 can be arranged such that an arbitrary input value can be input by the driver, i.e. an input value corresponding to an arbitrary maximal acceleration distance $S_{acc}$. The input unit can also be arranged such that the driver can choose one of a set of available input values, i.e. a value corresponding to one adjustment coefficient in a set of predefined adjustment coefficients, which are to be multiplied with the maximal acceleration distance $S_{acc}$ in order to adjust the maximal acceleration distance $S_{acc}$.

When the acceleration behaviour has been determined by the control unit 301, the control unit 301 controls the speed of the motor vehicle by controlling a speed altering device 302 of the motor vehicle. The speed altering device 302 can for example be a throttle altering device or any other device being able to altering the speed of the vehicle.

The system 300 for an automated speed control of a motor vehicle according to the invention may be modified by those skilled in the art, as compared to the exemplary embodiments described above. Especially, the system 300 may be modified in order to implement all of the embodiments of the method of the present invention.

As is obvious for a skilled person, a number of other implementations, modifications, variations and/or additions can be made to the above described exemplary embodiments. It is to be understood that the invention includes all such other implementations, modifications, variations and/or additions which fall within the scope of the claims.

The invention claimed is:

1. A method for determining, setting, and controlling a fuel efficient acceleration behavior of a motor vehicle for a predetermined road section comprising:
   determining an initial speed of said motor vehicle in a first position in said road section, and
   determining a target speed of said motor vehicle in a determined second position in said road section, wherein said second position is separated from said first position by an acceleration distance;
   dynamically determining a maximal acceleration distance $S_{acc}$ based on at least one first road condition for said road section and on at least one characteristic of said motor vehicle and said first position is determined such that said acceleration distance is shorter than or equal to said maximal acceleration distance $S_{acc}$;
   setting said initial and target speeds of said motor vehicle and said acceleration distance of said motor vehicle based on said determined initial and target speeds and acceleration distance; and
   controlling a speed of said motor vehicle, by a speed altering device of said motor vehicle, so that said motor vehicle reaches said set initial speed at said first position in said road section and reaches said set target speed at said second position in said road section, whereby said motor vehicle travels said set acceleration distance between said first position and said second position.

2. The method as claimed in claim 1, further comprising performing an acceleration within said acceleration distance, the acceleration having a property that is determined based on at least one second road condition for said road section.

3. The method as claimed in claim 2, wherein each of said at least one first and said at least one second road conditions is related to at least one road condition selected from a group consisting of: a topology for at least one part of said road section, at least one desired speed for at least one part of said road section, a straightness of at least one part of said road section, a traffic situation for at least one part of said road section, and a number of vehicles other than said motor vehicle present on at least one part of the road section.

4. The method as claimed in claim 1, wherein said at least one characteristic of said motor vehicle is related to revolutions per minute (rpm) and/or a momentum of an engine of said motor vehicle.

5. The method as claimed in claim 1, wherein said at least one characteristic of said motor vehicle is related to at least one of motor vehicle specific parameters or features selected from a group consisting of: weight, engine characteristics, air resistance, transmission, brake system, rolling resistance, total gear ratio, inertial forces, and various friction forces of or on the vehicle.

6. The method as claimed in claim 5, wherein said maximal acceleration distance $S_{acc}$ is determined according to:

$$s_{acc} = \int_{v_{initial}}^{v_{target}} \int \frac{F_{sum}(s)}{vm_t} ds,$$

where $F_{sum} = F_{engine}(\eta_{max}) - F_{brake} - F_{airdrag}(v) - F_{roll}(\alpha) - F_{gravity}(\alpha),$ where
$F_{engine}(\eta_{max})$ is a net engine force,
$F_{airdrag}(v)$ is a force caused by the air resistance of the motor vehicle,
$F_{roll}(\alpha)$ is a force caused by the rolling resistance,
$F_{gravity}(\alpha)$ is a force of gravity,
$\alpha$ is an incline of the road,
$v_{initial}$ is the initial speed for the motor vehicle in the first position,
$v_{target}$ is the target speed for the motor vehicle in the second position,
$m_t$ is a total dynamic vehicle mass, and
$v$ is the speed of the motor vehicle.

7. The method as claimed in claim 1, wherein said maximal acceleration distance $S_{acc}$ is also determined based on at least one input from a driver of said motor vehicle.

8. The method as claimed in claim 7, wherein said driver input is chosen according to any value selected from a group consisting of: a value corresponding to an arbitrary maximal acceleration distance $S_{acc}$; a value corresponding to one adjustment coefficient in a set of predefined adjustment coefficients, wherein said predefined adjustment coefficients are to be multiplied by said maximal acceleration distance $S_{acc}$; and a value corresponding to a speed change dependent maximal acceleration distance $S_{acc}$.

9. The method as claimed in claim 8, wherein said speed change dependent maximal acceleration distance $S_{acc}$ is dependent on an actual location on said road section where an acceleration is to be performed.

10. The method as claimed in claim 7, wherein said maximal acceleration distance $S_{acc}$ is determined such that said input by a driver of said vehicle is perceived as resembling an acceleration on a level road.

11. The method as claimed in claim 1, wherein a length of said predetermined road section is adjustable.

12. A computer program recorded on a non-transitory computer readable medium, which is run in a control unit of a motor vehicle, the program being configured to cause the control unit to execute the method according to claim 1.

13. A computer program product including a non-transitory computer readable medium and a computer program according to claim 12.

14. A computer program product according to claim 13, wherein said non-transitory computer readable medium consists of one or more devices selected from the group consisting of: ROM (Read-Only Memory), PROM (Programmable Read-Only Memory), EPROM (Erasable PROM), Flash memory, and EEPROM (Electrically Erasable PROM).

15. A control unit for determining a fuel efficient acceleration behavior of a motor vehicle for a predetermined road section, said control unit including:
   a determination apparatus configured and operable for determining said acceleration behaviour based on:
   a determined initial speed of said motor vehicle in a first position in said road section; and
   a determined target speed of said motor vehicle in a determined second position in said road section, said second position being separated from said first position by an acceleration distance;
   said control unit further including a first device configured and operable for determining said first position such that said acceleration distance is shorter than or equal to a maximal acceleration distance $S_{acc}$; and
   a second device for dynamically determining said maximal acceleration distance $S_{acc}$ based on at least one first road condition of said road section and on at least one characteristic of said motor vehicle.

16. The control unit as claimed in claim 15, wherein said control unit further includes a third device configured and operable for determining a property of an acceleration to be performed within said acceleration distance based on at least one second road condition for said road section.

17. The control unit as claimed in claim 15, wherein said second device for dynamically determining said maximal acceleration distance $S_{acc}$ is connected at least to a reception device configured and operable for receiving:
- positioning information concerning said vehicle;
- electronic map information;
- information related to said at least one road condition; and
- information related to said at least one characteristic of said motor vehicle.

18. The control unit as claimed in claim 17, wherein said reception device is also configured and operable for receiving at least one input from a driver of said motor vehicle.

19. The control unit as claimed in claim 18, wherein said reception device is also configured and operable to receive one type of input selected from the group consisting of: a value corresponding to an arbitrary maximal acceleration distance $S_{acc}$, and a value corresponding to one adjustment coefficient in a set of predefined adjustment coefficients, said one adjustment coefficient to be multiplied by said maximal acceleration distance $S_{acc}$.

20. The control unit as claimed in claim 15, wherein said control unit further includes adjustment means arranged for adjusting a length of said predetermined road section.

21. A system for an automated speed control of a motor vehicle, comprising:
- the control unit as claimed in claim 15; and
- a speed altering device of said motor vehicle configured and operable so as to be controlled by said control unit.

* * * * *

UNITED STATES PATENT AND TRADEMARK OFFICE
CERTIFICATE OF CORRECTION

PATENT NO. : 8,494,744 B2  Page 1 of 1
APPLICATION NO. : 13/129836
DATED : July 23, 2013
INVENTOR(S) : Al Alam et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 182 days.

Signed and Sealed this

Fifteenth Day of September, 2015

Michelle K. Lee
*Director of the United States Patent and Trademark Office*